United States Patent
Yamashita

(10) Patent No.: US 8,570,188 B2
(45) Date of Patent: Oct. 29, 2013

(54) DRIVER VISION SUPPORT SYSTEM AND VEHICLE INCLUDING THE SYSTEM

(75) Inventor: Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 271 days.

(21) Appl. No.: 13/193,348

(22) Filed: Jul. 28, 2011

(65) Prior Publication Data

US 2012/0026012 A1 Feb. 2, 2012

(30) Foreign Application Priority Data

Jul. 29, 2010 (JP) ................ 2010-170294

(51) Int. Cl.
*G08G 1/00* (2006.01)
*H04N 7/18* (2006.01)
*G06K 9/00* (2006.01)

(52) U.S. Cl.
USPC ........... 340/904; 340/903; 340/435; 340/436; 348/135; 348/148; 382/104; 701/1

(58) Field of Classification Search
USPC ................................. 340/903, 904
See application file for complete search history.

(56) References Cited

U.S. PATENT DOCUMENTS 6,476,855 B1 * 11/2002 Yamamoto ............ 348/148
7,139,412 B2 * 11/2006 Kato et al. ............ 382/104

FOREIGN PATENT DOCUMENTS

JP 2004-064131 2/2004

* cited by examiner

*Primary Examiner* — Donnie Crosland
(74) *Attorney, Agent, or Firm* — Hunton & Williams LLP

(57) ABSTRACT

A driver vision support system includes a camera configured to capture primary image data, a control apparatus configured to perform viewpoint conversion on the primary image data to create secondary image data from the viewpoint of the driver and prepares left A pillar image data corresponding to the left A pillar from the viewpoint of the driver right A pillar image data corresponding to the right A pillar, and at least one image display apparatus configured to display a first part of the secondary image data corresponding to the left blind spot area and the left blind spot adjacent area along with the left A pillar image data that is transparently superimposed and a second part of the secondary image data corresponding to the right blind spot area and the right blind spot adjacent area along with the right A pillar image data that is transparently superimposed.

10 Claims, 6 Drawing Sheets

DRIVER VISION SUPPORT SYSTEM AND VEHICLE INCLUDING THE SYSTEM

CLAIM OF PRIORITY

This application claims benefit of Japanese Patent Application No. 2010-170294 filed on Jul. 29, 2010, the contents of which is hereby incorporated by reference.

BACKGROUND OF THE DISCLOSURE

1. Field of the Disclosure

The present disclosure relates to a driver vision support system and a vehicle including the system.

2. Description of the Related Art

For safe driving, a vehicle includes a rear-view mirror and a side mirror which provide a driver the vision information on the area behind the vehicle.

In recent years, the area behind a vehicle has been photographed with a camera, and the acquired image has been displayed on a monitor inside the vehicle. Alternatively, an area in front of a vehicle has been photographed with a camera, and the acquired image has been displayed on a monitor inside the vehicle.

For example, in the image display for vehicle disclosed in Japanese Unexamined Patent Application Publication No. 2004-64131, from captured video of an area in front of a vehicle captured with a CCD camera, blind spot setting means extracts left and right front pillar blind spot video corresponding to blind spot areas by left and right front pillars. The left and right front pillar blind spot video is displayed on liquid crystal displays attached to the left and right front pillars.

According to the image display for vehicle, a driver may be allowed to recognize a condition surrounding the vehicle as if no blind spots by left and right front pillars exist.

However, according to the image display for vehicle disclosed in Japanese Unexamined Patent Application Publication No. 2004-64131, only the area mathematically determined as a blind spot is extracted from the captured video. For that reason, an obstacle within a blind spot area may not be displayed on a liquid crystal display with some calculation errors.

On the other hand, to a driver, not only left and right front pillars (A pillars) but also a sun visor and side mirrors cause blind spots. It is difficult for the apparatus for vehicle disclosed in Japanese Unexamined Patent Application Publication No. 2004-64131 to address the blind spot areas caused by a sun visor or a side mirror.

SUMMARY OF THE DISCLOSURE

The embodiments of the present disclosure were made in view of those matters, and the present disclosure provides a driver vision support system and a vehicle including the system configured to securely inform a driver of an obstacle present in a blind spot of a driver caused behind an A pillar of a vehicle.

The present disclosure uses the following solving means.

Solving means 1: According to an aspect of the present disclosure, there is provided a driver vision support system including a camera configured to capture primary image data including a left blind spot area behind an A pillar on the left side of a vehicle from the viewpoint of a driver, a left blind spot adjacent area around the left blind spot area, a right blind spot area behind an A pillar on the right side of the vehicle from the viewpoint of the driver, and a right blind spot adjacent area around the right blind spot area, a control apparatus configured to perform viewpoint conversion on the primary image data to create secondary image data from the viewpoint of the driver and prepares left A pillar image data corresponding to the A pillar on the left side from the viewpoint of the driver right A pillar image data corresponding to the A pillar on the right side, and at least one image display apparatus configured to display a first part of the secondary image data corresponding to the left blind spot area and the left blind spot adjacent area along with the left A pillar image data that is transparently superimposed and a second part of the secondary image data corresponding to the right blind spot area and the right blind spot adjacent area along with the right A pillar image data that is transparently superimposed.

In the driver vision support system according to the solving means 1, the image display apparatus displays the left blind spot adjacent area and right blind spot adjacent area along with the left blind spot area and right blind spot area behind the A pillars.

For that, if an obstacle exists in a blind spot area of a driver, the obstacle is securely displayed on the image display apparatus even with some viewpoint conversion error.

Further in the driver vision support system, the image display apparatus transparently displays the A pillar image data corresponding to the A pillars. This allows the driver to accurately grasp the position of the obstacle present in the left blind spot area, left blind spot adjacent area, right blind spot area or right blind spot adjacent area, independent of the form and/or position of the image display apparatus.

As a result, the driver vision support system may implement safe driving of the vehicle.

Solving means 2: The image display apparatus is disposed on an instrument panel of the vehicle.

In the driver vision support system according to the solving means 2, the image display apparatus is provided on the instrument panel, allowing the driver easy visual recognition of the image display apparatus. Because the image display apparatus is provided on an instrument panel, sharing the image display apparatus also by another system such as a car navigation system may reduce the space and cost for the image display apparatus.

Solving means 3: The first part is displayed on a left side part of the image display apparatus, and the second part is displayed on a right side part of the image display apparatus.

In the driver vision support system according to the solving means 3, the first part of the secondary image data is displayed on the left side part of the image display apparatus, and the second part of the secondary image data is displayed on the right side part of the image display apparatus. This allows the driver to accurately understand either left or right side where the obstacle exists even when the one image display apparatus displays the first part and second part.

Even when one image display apparatus is used for the display, displaying no other parts than the first part and second part of the secondary image data may provide a maximum display area for the first part and second part, allowing easy visual recognition of an obstacle.

Solving means 4: The image display apparatus includes a left image display apparatus and a right image display apparatus disposed on the left and right sides from the viewpoint of the driver, the left image display apparatus displays the first part, and the right image display apparatus displays the second part.

In the driver vision support system according to the solving means 4, the first part of the secondary image data is displayed on the left image display apparatus, and the second part of the secondary image data is displayed on the right image display apparatus. This allows the driver to accurately understand either left or right side where the obstacle exists.

Solving means 5: The driver vision support system further includes an alarming apparatus. In this case, the control apparatus determines whether any obstacle exists in the left blind spot area, the left blind spot adjacent area, the right blind spot area or the right blind spot adjacent area or not on the basis of the first part and second part of the secondary image data, and if the control apparatus determines that some obstacle exists, the alarming apparatus issues a warning sound.

In the driver vision support system according to the solving means 5, the alarming apparatus informs the driver of the existence of an obstacle with a warning sound. This allows the driver to focus on driving without the necessity for keep watching the image display apparatus at all times, and the driver can drive safely.

Solving means 6: The control apparatus determines whether an obstacle exists in the left blind spot area, the left blind spot adjacent area, the right blind spot area, or the right blind spot adjacent area or not on the basis of the first part and second part of the secondary image data, and if the control apparatus determines that some obstacle exists, the image display apparatus displays an alert.

In the driver vision support system according to the solving means 6, the alert display given on the image display apparatus allows the driver to securely visually recognize the obstacle. Thus, the driver can properly avoid the obstacle, and an accident may be prevented.

Solving means 7: The driver vision support system may further include an alarming apparatus configured to issue a warning sound for a predetermined period of time if the control apparatus determines that some obstacle exists. In this case, the image display apparatus displays the alert even after the warning sound stops.

In the driver vision support system according to the solving means 7, the driver may securely perform a series of operations including recognizing the existence of an obstacle with a warning sound and then checking the position of the obstacle on the image display apparatus. The driver may securely avoid the obstacle without overlooking, and an accident may be prevented.

Solving means 8: The left blind spot adjacent area includes a blind spot area behind a left side mirror of the vehicle from the viewpoint of the driver, the right blind spot adjacent area includes a blind spot area behind a right side mirror of the vehicle from the viewpoint of the driver, the control apparatus prepares left side mirror image data corresponding to the left side mirror and right side mirror image data corresponding to the right side mirror from the viewpoint of the driver, and the image display apparatus displays the first part along with the left A pillar image data and the left side mirror image data that are transparently superimposed and a second part along with the right A pillar image data and the right side mirror image data that are transparently superimposed.

In the driver vision support system according to the solving means 8, the position of an obstacle present in a blind spot by a side mirror may be accurately grasped, allowing safe driving.

Solving means 9: The left blind spot adjacent area includes a blind spot area behind a left side interior member near an A pillar on the left side of the vehicle from the viewpoint of the driver, the right blind spot adjacent area includes a blind spot area behind a right side interior member near an A pillar on the right side of the vehicle from the viewpoint of the driver, the control apparatus prepares left side interior member image data corresponding to the left side interior member near the A pillar on the left side and right side interior member image data corresponding to the right side interior member near the A pillar on the right side from the viewpoint of the driver, and the image display apparatus displays the first part along with the left A pillar image data and the left side interior member image data that are transparently superimposed and displays the second part along with the right A pillar image data and the right side interior member image data that are transparently superimposed.

In the driver vision support system according to the solving means 9, the position of an obstacle present in a blind spot by an interior member near the left or right A pillar may be accurately grasped, allowing safe driving.

Solving means 10: According to another aspect of the present disclosure, there is provided a vehicle including the driver vision support system according to the solving means 10.

In the vehicle according to the solving means 10, a driver may securely recognize an obstacle present in a blind spot of the driver behind the A pillars of the vehicle 10 by using the driver vision support system. Thus, the vehicle may securely prevent an accident and allows safe driving.

DETAILED DESCRIPTION OF THE DISCLOSURE

The following description is intended to convey a thorough understanding of the embodiments described by providing a number of specific embodiments and details involving a driver vision support system and vehicle including the system. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

The various embodiments of the present disclosure will be described below with reference to drawings.

Figure 1:
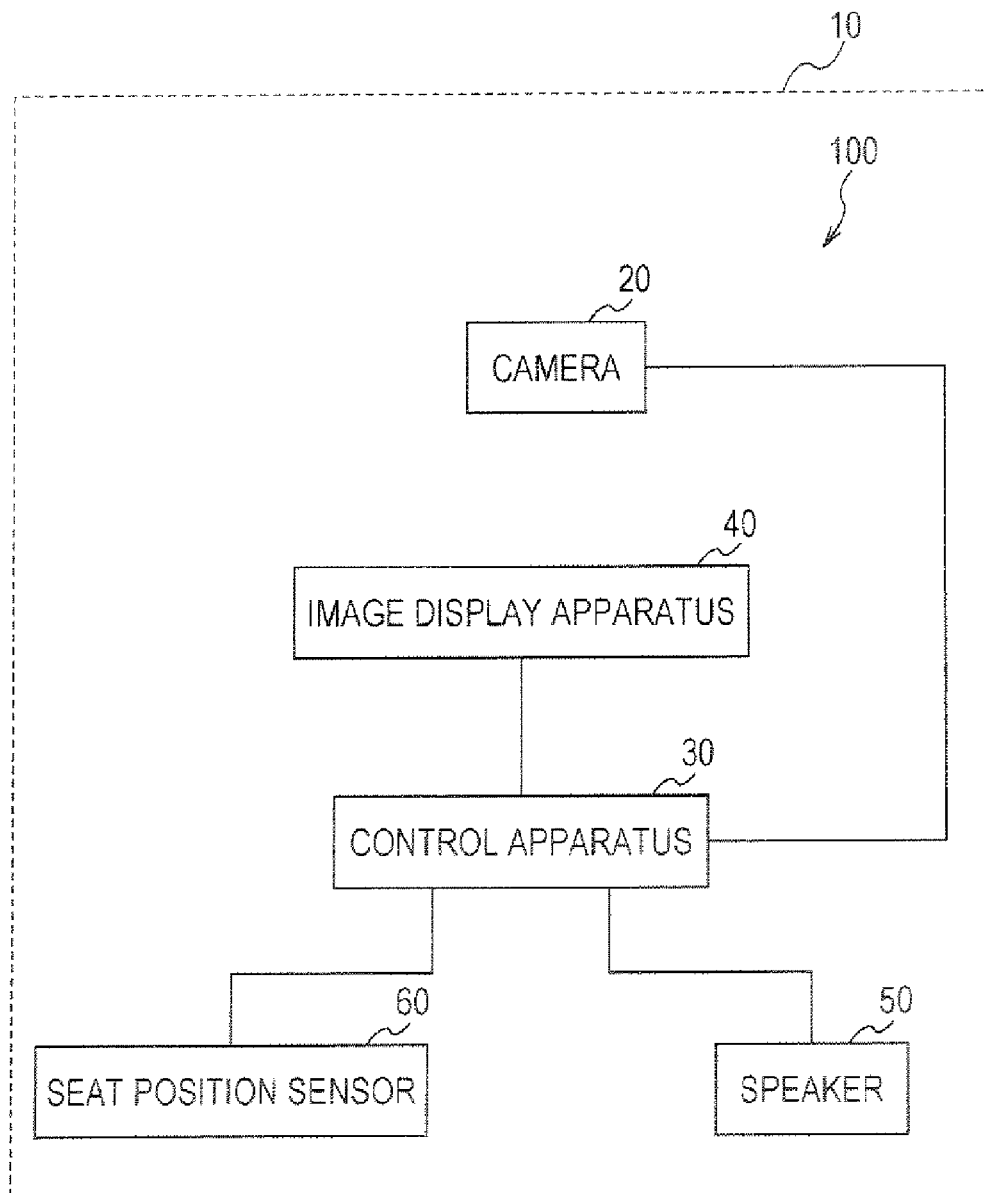
FIG. 1 is a block diagram schematically illustrating a configuration of a driver vision support system according to an embodiment applied to a vehicle.

FIG. 1 illustrates a schematic configuration of a driver vision support system 100 according to an exemplary embodiment applied to a vehicle 10.

The driver vision support system 100 may include a camera 20, a control apparatus 30, and an image display apparatus 40.

In the various embodiments, the camera 20 may be a digital camera having an imaging element and generating digital image data (primary image data) corresponding to a captured range.

Figure 2:
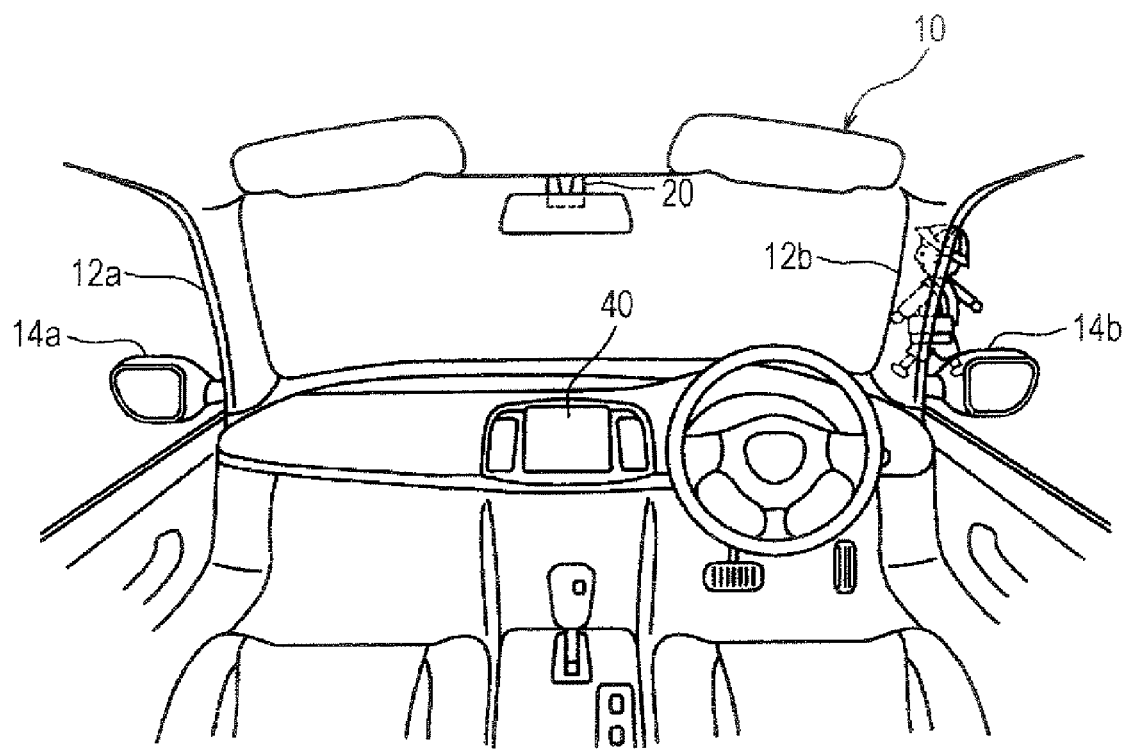
FIG. 2 is a schematic diagram illustrating the front side of the interior of a vehicle applying the driver vision support system in FIG. 1.

As illustrated in FIG. 2, the camera 20 may be disposed in front of a rear-view mirror and may be fixed to a front window or the ceiling of the vehicle 10. Thus, the camera 20 may be disposed in front of the head of a driver and at a substantially same position as those of left and right A pillars (front pillars) 12a and 12b, respectively, of the vehicle 10 in the front-back direction of the vehicle 10 and at the center in the width direction of the vehicle 10.

Figure 3:
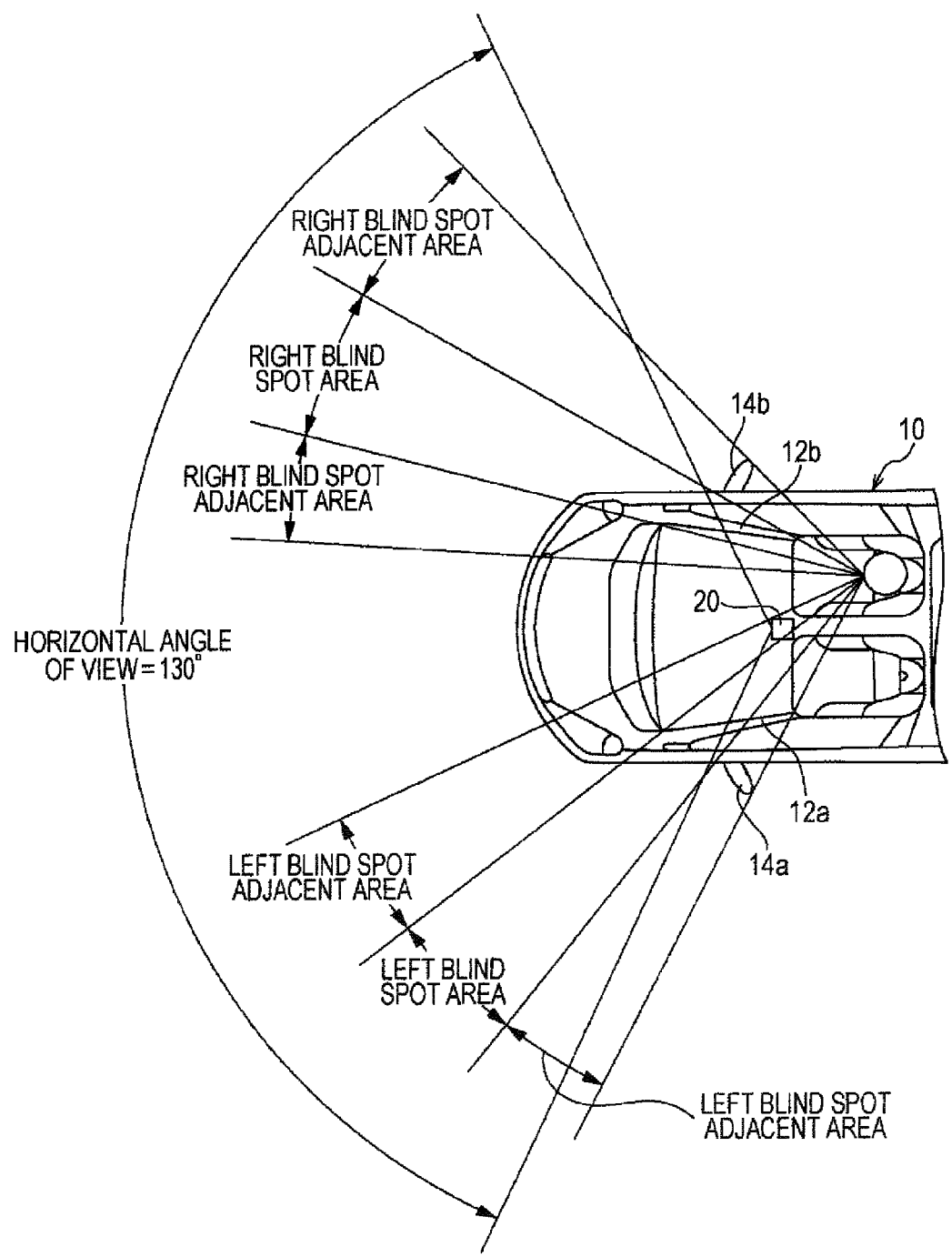
FIG. 3 is a diagram for illustrating the angle of view of a camera used in the driver vision support system in FIG. 1 and the field of view of the driver.

As illustrated in FIG. 3, the camera 20 may face toward the front of the vehicle 10, and the horizontal angle of view of the camera 20 may be 130°, for example. Classifying on the basis of angles of view, the camera 20 may be a super-wide-angle camera or a fisheye camera. The captured range by the camera 20 may include a left blind spot area behind the A pillar 12a on the left side of the vehicle 10 from the viewpoint of a driver of the vehicle 10, a left blind spot adjacent area surrounding the left blind spot area, a right blind spot area behind the A pillar 12b on the right side of the vehicle 10 from the viewpoint of the driver, and a right blind spot adjacent area surrounding the right blind spot area.

According to this embodiment, the left blind spot adjacent area may include a blind spot area behind a left side mirror 14a from the viewpoint of a driver, and the right blind spot adjacent area may include a blind spot area behind a right side mirror 14b from the viewpoint of the driver.

Also, according to this embodiment, the left blind spot adjacent area may include a blind spot area behind an interior member (such as a part of a dashboard and a part of a door panel) near the A pillar 12a on the left side from the viewpoint of the driver, and the right blind spot adjacent area may include a blind spot area behind an interior member (such as a part of a dashboard and a part of a door panel) near the A pillar 12b on the right-side from the viewpoint of the driver.

The control apparatus 30 may be configured by a micro computer, for example, and may include a CPU (central processing unit) and memory. The control apparatus 30 may be electrically connected to the camera 20 and may read primary image data created by the camera 20. Viewpoint converting processing may be performed on the primary image data to create a secondary image data from the viewpoint of a driver.

Thus, the viewpoint of the primary image data may be the camera 20 while the viewpoint of the secondary image data may be the eye of the driver.

The control apparatus 30 may extract the part (first part) corresponding to the left blind spot area and left blind spot adjacent area from the secondary image data and correct a distortion. The control apparatus 30 may also extract the part (second part) corresponding to the right blind spot area and right blind spot adjacent area from the secondary image data and correct a distortion.

On the other hand, the control apparatus 30 may prepare left A pillar image data corresponding to the left A pillar 12a from the viewpoint of a driver and prepares right A pillar image data corresponding to the right A pillar 12b from the viewpoint of the driver.

The image data corresponding to the A pillars 12a and 12b on the left side and right side are image data representing the positions where the left side and right A pillars 12a and 12b may exist, for example, and may be configured by lines representing the contours or forms of the A pillars 12a and 12b on the left side and right side.

According to this embodiment in addition, the control apparatus 30 may prepare left side mirror image data corresponding to the side mirror 14a on the left side from the viewpoint of a driver and prepares right side mirror image data corresponding to the right side mirror 14b from the viewpoint of the driver.

The image data corresponding to the side mirrors 14a and 14b on the left side and right side may be image data representing the positions where the left side and right side mirrors 14a and 14b may exist and, for example, may be configured by lines representing the contours or forms of the side mirrors 14a and 14b on the left side and right side.

According to this embodiment, the control apparatus 30 may prepare left side interior member image data corresponding to an interior member (such as a part of a dashboard and a part of a door panel) near the A pillar 12a on the left side from the viewpoint of a driver and may prepare right-side interior member image data corresponding to an interior member (such as a part of a dashboard and a part of a door panel) near the A pillar 12b on the right side from the viewpoint of a driver.

The image data corresponding to interior members on the left side and right side refer to image data representing the positions where the left side and right side interior members on may exist, and, for example, may be configured by lines representing the contours or forms of the left side and right side interior members.

For example, the control apparatus 30 may prestore reference data for the left A pillar image data, right A pillar image data, left side mirror image data, right side mirror image data, left side interior member image data, and right side interior member image data. Viewpoint conversion may be performed on the reference data to generate left A pillar image data, right A pillar image data, left side mirror image data, right side mirror image data, left side interior member data, and right side interior member data.

Also, the control apparatus 30 may prestore, for each position of the viewpoint of a driver, a set of the left A pillar image data, right A pillar image data, left side mirror image data, right side mirror image data, left side interior member data, and right side interior member data. A proper set may be selected in accordance with the position of the viewpoint of a driver.

The left A pillar image data, right A pillar image data, left side mirror image data, right side mirror image data, left side interior member data, and right side interior member data may correspond to the substantial contour or form of the left and right A pillars 12a and 12b, side mirrors 14a and 14b, and interior members.

The left A pillar image data, left side mirror image data, and left side interior member data may not be three separate image data pieces but may be merged to one or two image data pieces, for example. Similarly, the right A pillar image data, right side mirror image data, and right side interior member data may not be three separate image data pieces but may be merged to one or two image data pieces, for example.

Figure 4:
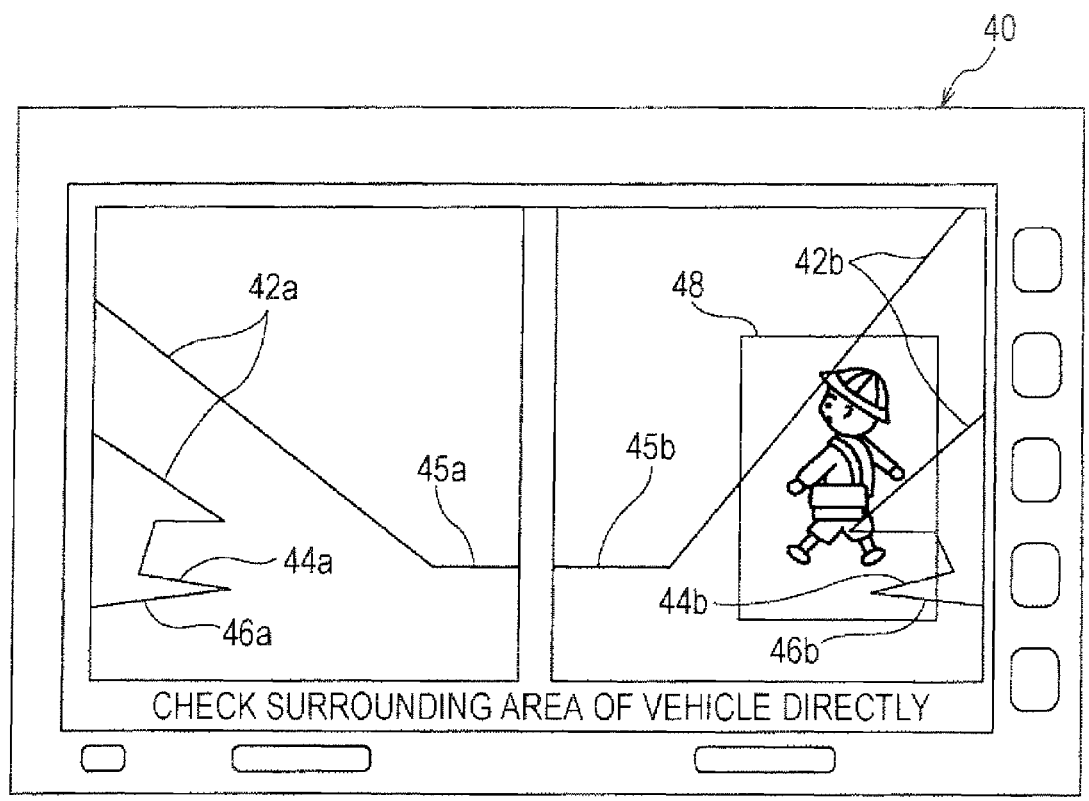
FIG. 4 is a schematic diagram illustrating an enlarged view of the image display apparatus using the driver vision support system in FIG. 1.

The control apparatus 30 may be electrically connected to the image display apparatus 40. As illustrated in FIG. 4, the control apparatus 30 may display the first part after distortion correction along with the transparently superimposed left A pillar image data, left side mirror image data and left side interior member image data on the image display apparatus 40. The control apparatus 30 further may display the second part after the distortion correction along with the transparently superimposed right A pillar image data, right side mirror image data and right side interior member image data on the image display apparatus 40.

The displaying image data on the image display apparatus 40 refers to displaying an image reproduced on the basis of the image data. Thus, as illustrated in FIG. 4, on the basis of the left A pillar image data, left side mirror image data, right A pillar image data, right side mirror image, left side interior member image data, and right side interior member image data, a line 42*a* representing the left A pillar 12*a*, a line 42*b* representing the right A pillar 12*b*, a line 44*a* representing the left side mirror 14*a*, a line 44*b* representing the right side mirror 14*b*, lines 45*a* and 46*a* representing a left side interior member, and lines 45*b* and 46*b* representing a right side interior member may be displayed on image display areas of the image display apparatus 40.

According to various embodiments, the control apparatus 30 may include a function of using the first part and second part after distortion correction extracted from the secondary image data to determine whether a mobile unit being an obstacle, such as a human being, a bicycle, motor cycle and a vehicle in the left blind spot area, left blind spot adjacent area, right blind spot area, and/or right blind spot adjacent area or not.

If the control apparatus 30 determines that an obstacle exists, the control apparatus 30 may issue a warning sound through the speaker 50. The control apparatus 30 may issue a warning sound only for a predetermined period of time. The warning sound may be a continuous sound like a beep or may be a discontinuous sound like "blip, blip, blip". Also, the control apparatus may issue a visual warning indication on the image display areas of image display apparatus 40.

For example, the control apparatus 30 further may display an alert on the image display apparatus 40 If the control apparatus 30 determines that an obstacle exists. The alert may be a message, "CHECK SURROUNDING AREA OF VEHICLE DIRECTLY" displayed on a lower part of the image display area of the image display apparatus 40, as illustrated in FIG. 4, for example. The alert to be displayed in the image display area may include, for example, a red frame 48 around the detected obstacle. The obstacle is a child in FIG. 4.

The warning sound issuing period and alert display period may be set as required. Preferably, according to this embodiment, the alert display is continuously displayed even after the warning sound stops. In other words, the alert display period may be set longer than the warning sound issuing period.

The image display apparatus 40 may be a liquid crystal display, for example. Referring back to FIG. 2, the image display apparatus 40 may be provided at the center of the instrument panel (dashboard) of the vehicle 10. The image display area of the image display apparatus 40 may be divided into two left side and right side parts, as illustrated in FIG. 4. The left side part may display the first part, and the right side part may display the second part.

Referring back to FIG. 1, the driver vision support system 100 may have a seat position sensor 60 configured to detect the position of the driver's seat in the front-back direction in order to raise the precision of viewpoint converting processing by the control apparatus 30. The seat position sensor 60 may be electrically connected to the control apparatus 30. The control apparatus 30 may calculate or estimate the position of the viewpoint of the driver on the basis of the position of the driver's seat detected by the seat position sensor 60 and may perform viewpoint converting processing.

Figure 5:
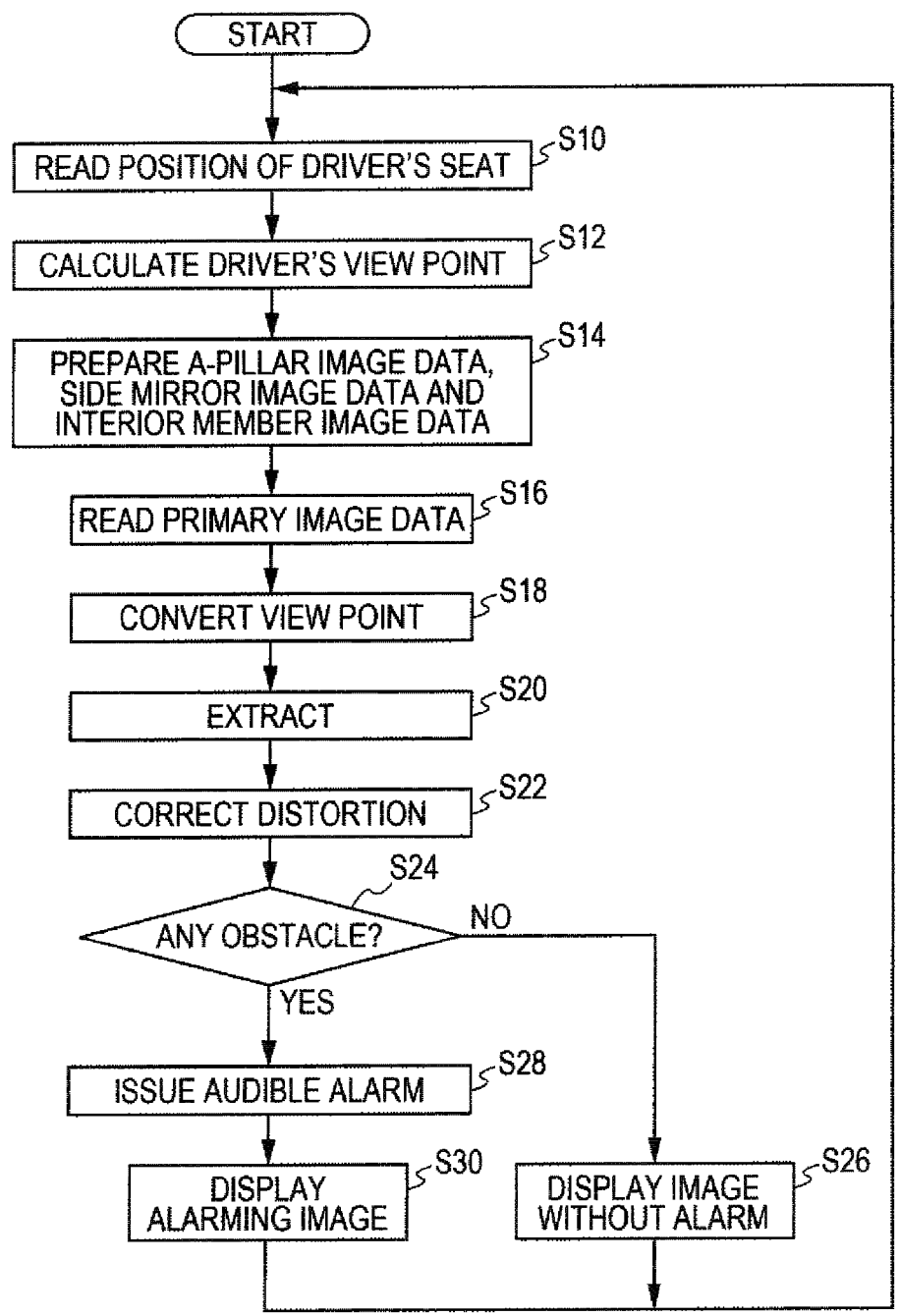
FIG. 5 is a flowchart schematically illustrating a program to be executed by a control apparatus in the driver vision support system in FIG. 1.

FIG. 5 illustrates a schematic flowchart of a program to be executed by the control apparatus 30. The program may be executed when the engine of the vehicle 10 starts, for example.

The control apparatus 30 may first read the position of the driver's seat detected by the seat position sensor 60 (step S10) and calculates the viewpoint of the driver from the position of the driver's seat (step S12).

The control apparatus 30 may prepare the left A pillar image data, right A pillar image data, left side mirror image data, right side mirror image data, left side interior member image data, and right side interior member image data corresponding to the calculated viewpoint of the driver (step S14).

The control apparatus 30 also may read the primary image data captured by the camera 20 (step S16), perform viewpoint conversion on the read primary image data on the basis of the viewpoint of the driver calculated in step S12 and thus create the secondary image data (step S18).

The control apparatus 30 may then extract the first part corresponding to the left blind spot area and left blind spot adjacent area and the second part corresponding to the right blind spot area and right blind spot adjacent area from the secondary image data (step S20) and may perform distortion correction on the extracted first part and second part (step S22).

The control apparatus 30 may then determine whether the distortion-corrected first part and second part includes a mobile unit being an obstacle or not (step S24). In other words, whether the left blind spot area, left blind spot adjacent area, right blind spot area, and right blind spot adjacent area has an obstacle or not is determined.

If it is determined that no obstacle exists in step S24, the control apparatus 30 may display an image without an alarm on the image display apparatus 40 (step S26). More specifically, the control apparatus 30 may display the distortion-corrected first part along with the transparently superimposed left A pillar image data, left side mirror image data, and left side interior member image data on the left half of the image display area of the image display apparatus 40. The control apparatus 30 further may display the distortion-corrected second part along with the transparently superimposed right A pillar image data, right side mirror image data, and right side interior member image data on the right half of the image display area of the image display apparatus 40.

If it is determined that some obstacle exists in step S24 on the other hand, the control apparatus 30 may issue a warning sound through the speaker 50 (step S28) and may display an image with an alarm on the image display apparatus 40 (step S30).

The image with an alarm may include an alert display in addition to the image without an alarm in step S26. More specifically, the alert display may include a message displayed on a lower part of the image display area of the image display apparatus 40 and the red frame 48 around an obstacle.

After step S26 or step S30 ends, the program flow may return to step S10.

In the driver vision support system 100, the image display apparatus 40 may display the left blind spot adjacent area and right blind spot adjacent area along with the left blind spot area and right blind spot area behind the left and right A pillars 12*a* and 12*b*.

For that, if an obstacle exists in a blind spot area of a driver, the obstacle may be securely displayed on the image display apparatus 40 even with some viewpoint conversion error.

Further in the driver vision support system 100, the image display apparatus 40 may transparently display the left side and right A pillar image data corresponding to the left and right A pillars 12*a* and 12*b*. This allows the driver to accurately understand the position of the obstacle present in the left blind spot area, left blind spot adjacent area, right blind spot area or right blind spot adjacent area, independent of the form and/or position of the image display apparatus 40.

As a result, the driver vision support system 100 may implement safe driving of the vehicle 10.

According to the driver vision support system 100 according to the various embodiments, the image display apparatus 40 may be provided on the instrument panel, for example, or any other location similarly allowing the driver easy visual recognition of the image display apparatus 40.

Also, the first part of the secondary image data may be displayed on the left side part of the image display apparatus 40, and the second part of the secondary image data may be displayed on the right side part of the image display apparatus. This allows the driver to accurately understand either left or right side where the obstacle exists even when the one image display apparatus 40 displays the first part and second part.

Even when one image display apparatus 40 is used for the display, displaying no other parts than the first part and second part of the secondary image data may provide a maximum display area for the first part and second part, allowing easy visual recognition of an obstacle.

If the existence of an obstacle is determined, a warning sound may be given to notify the existence of an obstacle to the driver. This allows the driver to focus on driving without the necessity for keep watching the image display apparatus 40 at all times, and the driver can drive safely.

If the existence of an obstacle is determined, an alert display is given on the image display apparatus 40. The alert display given on the image display apparatus 40 allows the driver to securely visually recognize the obstacle. Thus, the driver can properly avoid the obstacle, and an accident may be prevented.

Also, an alert display may be given even after a warning sound stops. Thus, the driver may securely perform a series of operations including recognizing the existence of an obstacle with a warning sound and then checking the position of the obstacle on the image display apparatus 40. The driver may securely avoid the obstacle without overlooking, and an accident may be prevented.

Because a warning sound stops after a lapse of a predetermined period of time, the driver may not be bothered by the warning sound.

The position of an obstacle present in a blind spot by the left and right side mirror 14a or 14b may be accurately understood, allowing safe driving.

Also, the position of an obstacle present in a blind spot by an interior member near the left or right A pillar 12a or 12b may be accurately understood, allowing safe driving.

In the vehicle 10 including the driver vision support system 100 according to the various embodiments, a driver may securely recognize an obstacle present in a blind spot of the driver behind the left and right A pillars 12a and 12b of the vehicle 10 by using the driver vision support system 100. Thus, the vehicle 10 may securely prevent an accident and allows safe driving.

The present invention is not limited to the aforementioned embodiment but may include embodiments having various changes in addition to the aforementioned embodiment.

For example, according to the aforementioned embodiment, the control apparatus 30 may perform distortion correction. However, the distortion correction may be omitted. When the camera 20 is used to capture the left blind spot area and right blind spot area, the angle of view of the camera 20 increases, which may increase the distortion of the primary image data With a large distortion, the precision for detection of an obstacle may decrease. For that, the distortion correction may be performed when the one camera 20 is used to capture for obstacle detection.

According to the aforementioned embodiment, the seat position sensor 60 may be used as means for calculating or estimating the viewpoint of a driver (viewpoint determination means). However, instead of or in addition to the seat position sensor 60, an eyepoint sensor may be used for detecting the position of the eyes of the driver.

According to the aforementioned embodiment, a warning sound or alert display may be given for warning the driver if the existence of an obstacle is determined. However, the vehicle 10 may be stopped more actively. In other words, the driver vision support system 100 may be used for automatic control over the vehicle 10.

According to the aforementioned embodiments, the driver vision support system 100 and a car navigation system may share the image display apparatus 40. This may reduce the necessary space or cost for the image display apparatus 40.

When the driver vision support system 100 and a car navigation system share the image display apparatus 40, the control apparatus 30 may cause the image display apparatus 40 to display the first part and second part only if the existence of an obstacle determines. In the other cases, the car navigation system may cause the image display apparatus 40 to display a map, for example.

Figure 6:
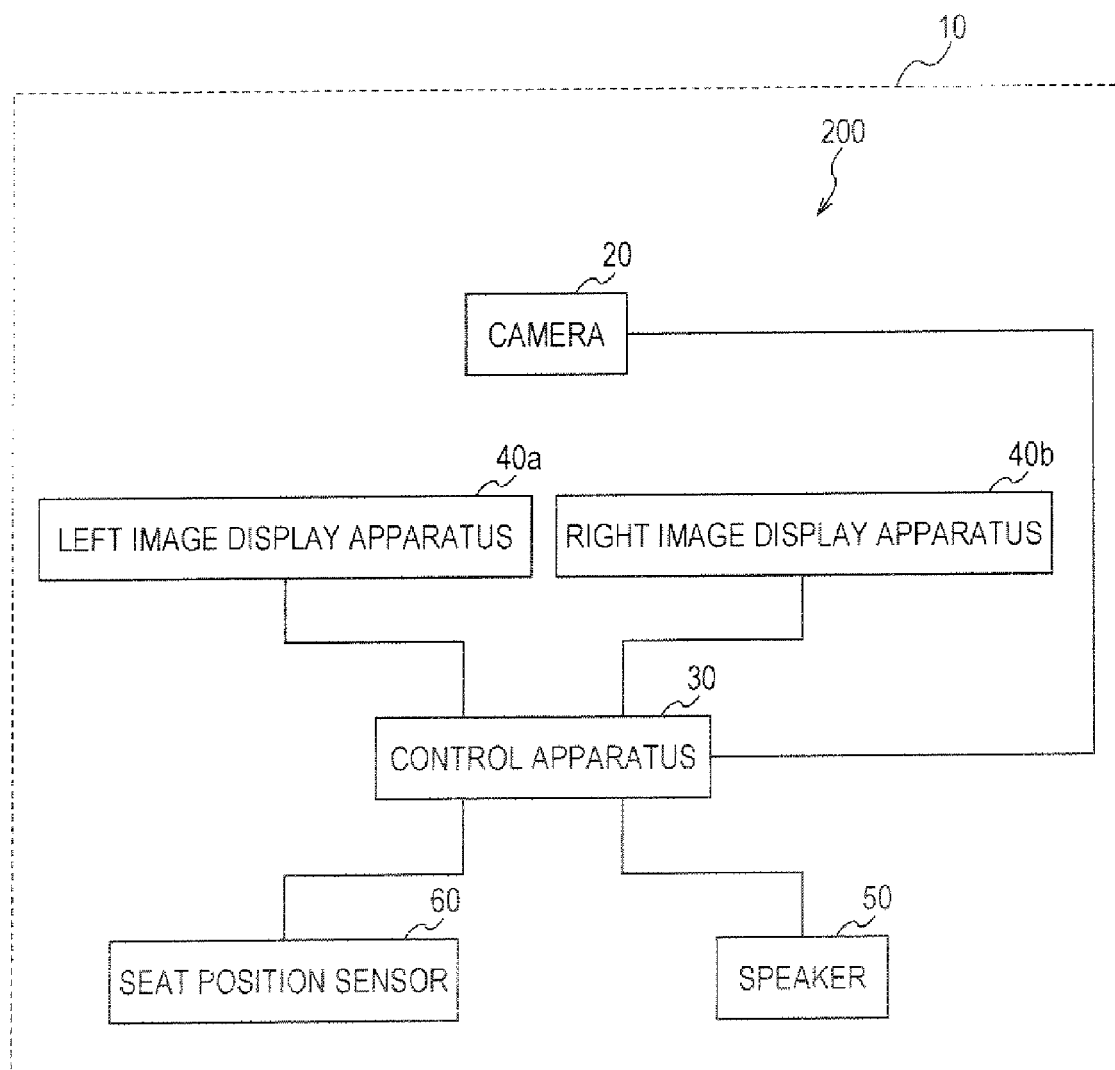
FIG. 6 is a block diagram schematically illustrating the configuration of a driver vision support system according to a variation example.

The driver vision support system 100 according to the aforementioned embodiments has one image display apparatus 40. However, like a driver vision support system 200 according to a variation example illustrated in FIG. 6, a left image display apparatus 40a and a right image display apparatus 40b may be provided on the left and right sides from the viewpoint of the driver. In this case, the left image display apparatus 40a may display the first part of the secondary image data, and the right image display apparatus 40b may display the second part of the secondary image data. Thus, either left or right part having an obstacle can be accurately understood.

Other configurations and programs described with reference to drawings are all examples, and they may be changed as necessary to implement the present invention.

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A driver vision support system comprising:
   a camera configured to capture primary image data including a left blind spot area behind an A pillar on the left side of a vehicle from the viewpoint of a driver, a left blind spot adjacent area around the left blind spot area, a right blind spot area behind an A pillar on the right side of the vehicle from the viewpoint of the driver, and a right blind spot adjacent area around the right blind spot area;
   a control apparatus configured to perform viewpoint conversion on the primary image data to create secondary image data from the viewpoint of the driver and prepares left A pillar image data corresponding to the A pillar on the left side from the viewpoint of the driver right A pillar image data corresponding to the A pillar on the right side; and at least one image display apparatus configured to display a first part of the secondary image data corresponding to the left blind spot area and the left blind spot adjacent area along with the left A pillar image data that is transparently superimposed and a second part of the secondary image data corresponding to the right blind spot area and the right blind spot adjacent area along with the right A pillar image data that is transparently superimposed.

2. The driver vision support system according to claim 1, wherein the image display apparatus is disposed on an instrument panel of the vehicle.

3. The driver vision support system according to claim 1, wherein:

the first part is displayed on a left side part of the image display apparatus; and the second part is displayed on a right side part of the image display apparatus.

4. The driver vision support system according to claim 1, wherein:

the image display apparatus includes a left image display apparatus and a right image display apparatus disposed on the left and right sides from the viewpoint of the driver;

the left image display apparatus displays the first part; and the right image display apparatus displays the second part.

5. The driver vision support system according to claim 1, further comprising an alarming apparatus, wherein:

the control apparatus determines whether any obstacle exists in the left blind spot area, the left blind spot adjacent area, the right blind spot area or the right blind spot adjacent area or not on the basis of the first part and second part of the secondary image data; and if the control apparatus determines that some obstacle exists, the alarming apparatus issues a warning sound.

6. The driver vision support system according to claim 1, wherein:

the control apparatus determines whether an obstacle exists in the left blind spot area, the left blind spot adjacent area, the right blind spot area, or the right blind spot adjacent area or not on the basis of the first part and second part of the secondary image data; and if the control apparatus determines that some obstacle exists, the image display apparatus displays an alert.

7. The driver vision support system according to claim 6, further comprising an alarming apparatus configured to issue a warning sound for a predetermined period of time if the control apparatus determines that some obstacle exists, wherein:

the image display apparatus displays the alert even after the warning sound stops.

8. The driver vision support system according to claim 1, wherein:

the left blind spot adjacent area includes a blind spot area behind a left side mirror of the vehicle from the viewpoint of the driver;

the right blind spot adjacent area includes a blind spot area behind a right side mirror of the vehicle from the viewpoint of the driver;

the control apparatus prepares left side mirror image data corresponding to the left side mirror and right side mirror image data corresponding to the right side mirror from the viewpoint of the driver; and the image display apparatus displays the first part along with the left A pillar image data and the left side mirror image data that are transparently superimposed and a second part along with the right A pillar image data and the right side mirror image data that are transparently superimposed.

9. The driver vision support system according to claim 1, wherein:

the left blind spot adjacent area includes a blind spot area behind a left side interior member near an A pillar on the left side of the vehicle from the viewpoint of the driver;

the right blind spot adjacent area includes a blind spot area behind a right side interior member near an A pillar on the right side of the vehicle from the viewpoint of the driver;

the control apparatus prepares left side interior member image data corresponding to the left side interior member near the A pillar on the left side and right side interior member image data corresponding to the right side interior member near the A pillar on the right side from the viewpoint of the driver; and the image display apparatus displays the first part along with the left A pillar image data and the left side interior member image data that are transparently superimposed and displays the second part along with the right A pillar image data and the right side interior member image data that are transparently superimposed.

10. A vehicle comprising the driver vision support system according to claim 1.

* * * * *